June 14, 1966  J. J. MEHRING  3,255,645
INDEXING TOOL HOLDER
Filed May 6, 1963  4 Sheets-Sheet 1
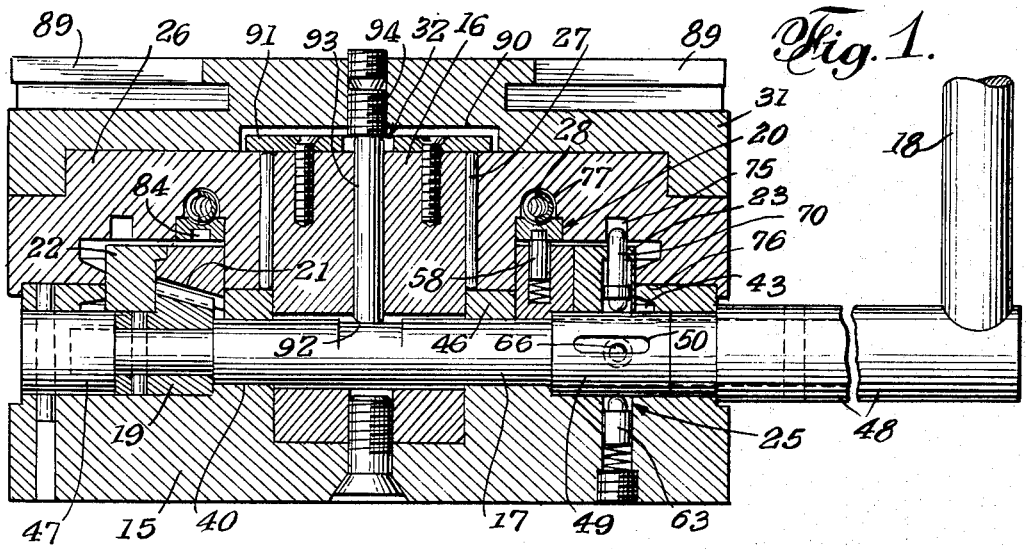
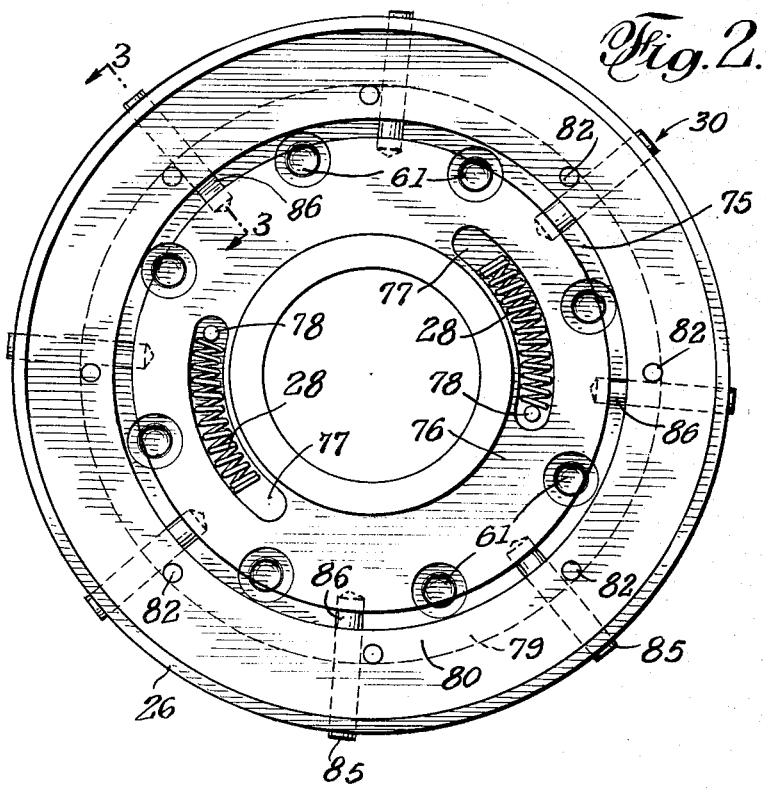
INVENTOR.
JAMES J. MEHRING
BY C. F. Stratton
ATTORNEY June 14, 1966  J. J. MEHRING  3,255,645
INDEXING TOOL HOLDER
Filed May 6, 1963  4 Sheets-Sheet 2
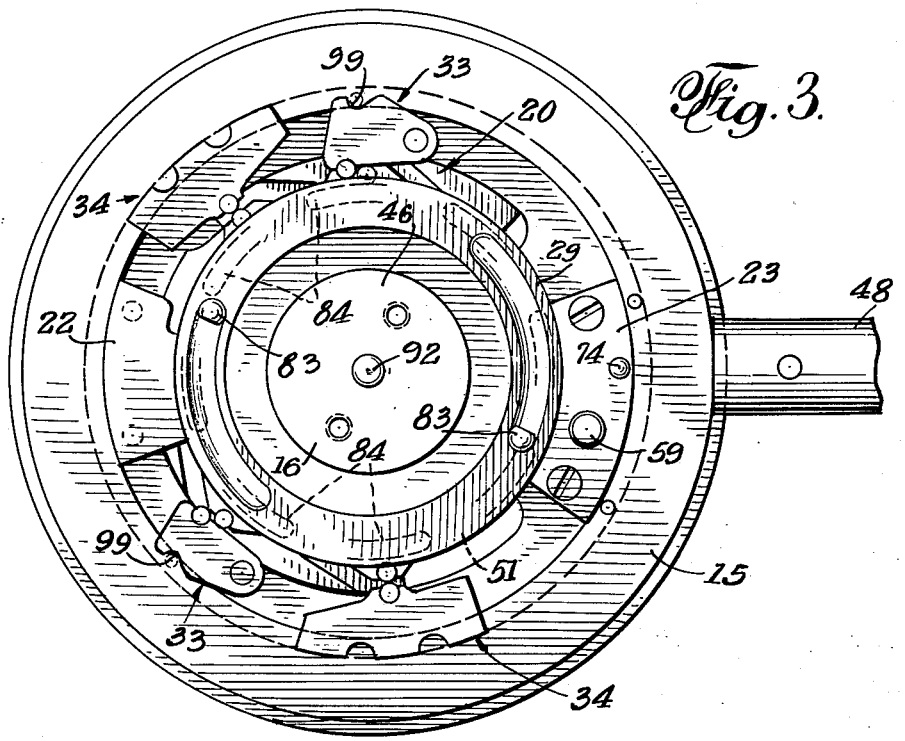
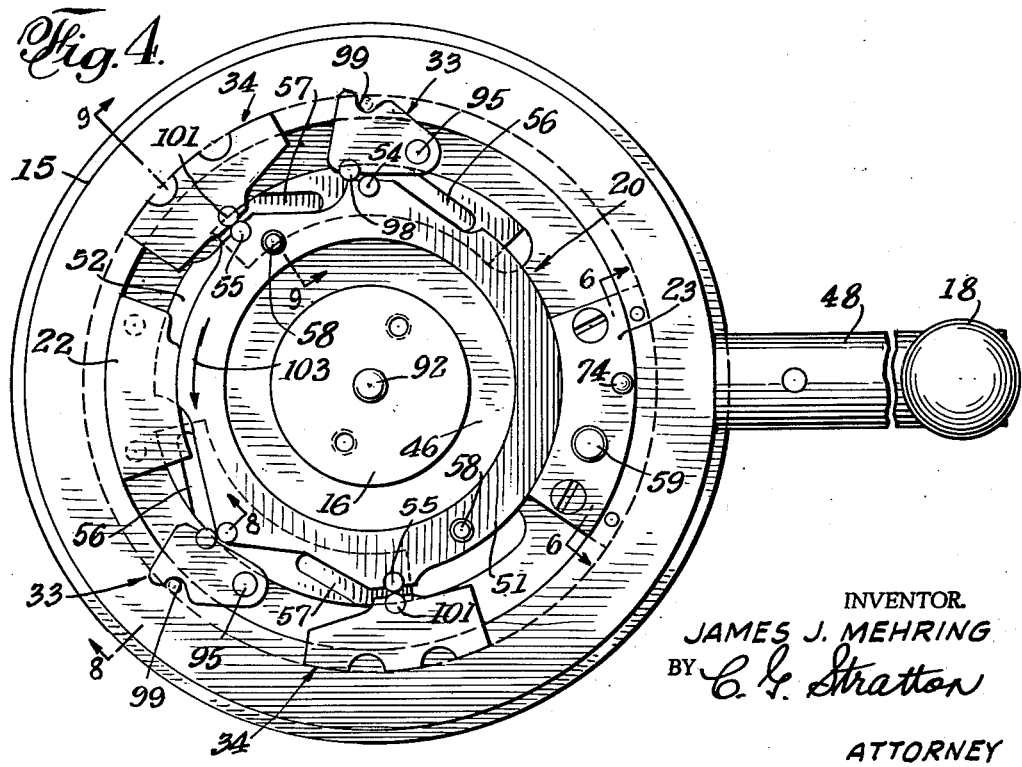
INVENTOR.
JAMES J. MEHRING
BY C. G. Stratton
ATTORNEY June 14, 1966   J. J. MEHRING   3,255,645
INDEXING TOOL HOLDER
Filed May 6, 1963   4 Sheets-Sheet 3
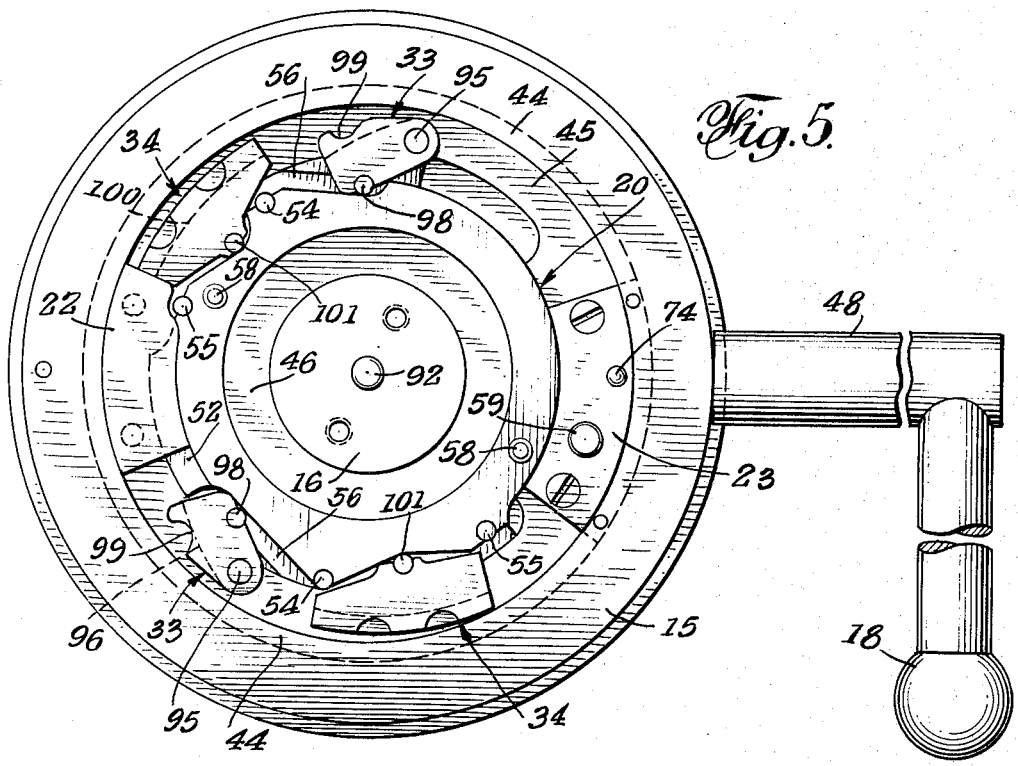
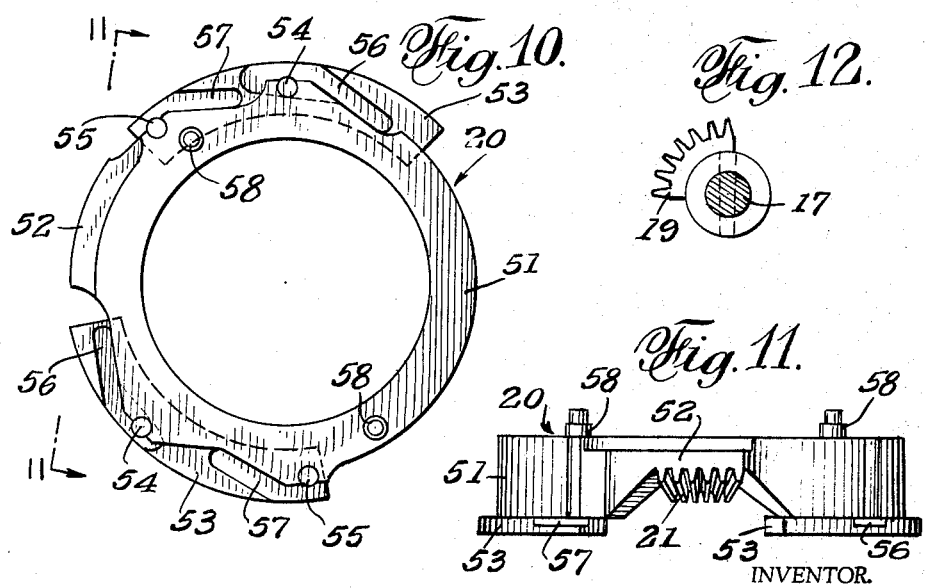
INVENTOR.
JAMES J. MEHRING
BY C. G. Stratton
ATTORNEY June 14, 1966  J. J. MEHRING  3,255,645
INDEXING TOOL HOLDER
Filed May 6, 1963  4 Sheets-Sheet 4

INVENTOR.
JAMES J. MEHRING
BY C. G. Stratton
ATTORNEY

United States Patent Office 3,255,645
Patented June 14, 1966

3,255,645
INDEXING TOOL HOLDER
James J. Mehring, 6542 Fry St., Bell Gardens, Calif.
Filed May 6, 1963, Ser. No. 278,169
11 Claims. (Cl. 74—822)

This invention relates to an indexing, rotary tool holder having general utility and especially adapted for use on engine and turret lathes and also as a work-holding fixture for milling and drilling machines.

An object of the present invention is to provide a tool holder of the indexing type which is operable by self-power that is manually stored in advance of each indexing movement of the device.

Another object of the invention is to provide a tool holder as above characterized that is adjustable to index at one to four indexing increments, as desired.

A further object of the invention is to provide a tool holder that provides means for accurate index location of the holder plate and clamping thereof simply by a quarter turn forward and back of an operating handle.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a cross-sectional view of the present rotary tool holder in its locked position.

FIG. 2 is a bottom plan view of the rotational portion of the holder.

FIG. 3 is a plan view of the base portion of the device, as seen with the portion of FIG. 2 removed, and in the locked position of FIG. 1.

FIG. 4 is a similar view of said base portion with a station advancing ratchet plate removed to show detail therebeneath.

FIG. 5 is a plan view showing said base portion of the device in released position so that the rotational portion of the device may index to the next stop position.

FIG. 10 is a plan view of a cam ring assembly used for operating the various components of the device.

FIG. 11 is an edge view of said ring as seen from the side thereof represented by the line 11—11 of FIG. 10.

FIG. 12 is an end view of a gear element on the operating shaft of the device and which oscillates said cam ring assembly during back and forth ninety-degree movement of the shaft handle.

Figure 6:
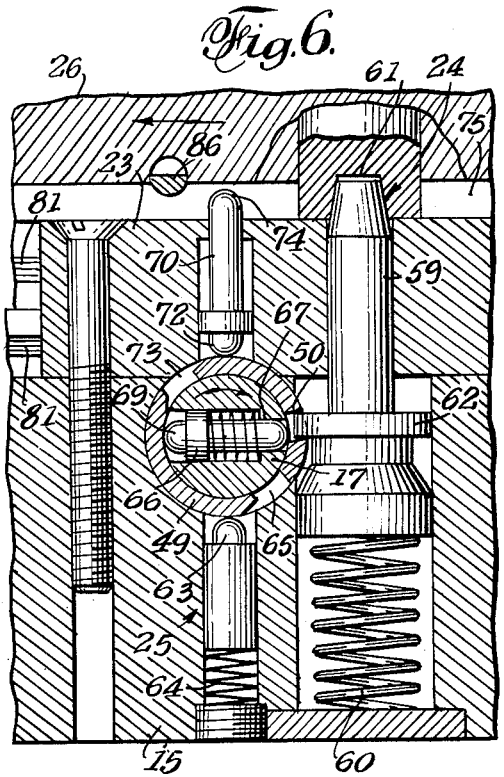
FIG. 6 is an enlarged vertical sectional view, as taken on the line 6—6 of FIG. 4 with the trip and locking means of the tool holder in the locked position of FIGS. 1, 3 and 4.

The present tool is designed to have eight indexing positions and may be set to advance from one to four by suitable adjustment of stop elements. The tool is provided with an operating handle that, for each indexing movement of the tool, is moved ninety degrees forwardly and then backwardly to its initial position. The forward or downward movement of the operating handle, in sequence, releases the holder portion of the device together with accuracy locators for said portion, raises the holder portion so the same is free of the base portion of the device for frictionless rotation relative to the base portion, stores energy in springs provided while said holder portion is locked to the base portion, releases said holder portion and, finally, sets up trip means for the next index position of said holder portion. The latter portion, under bias of the mentioned springs, is propelled to the next index position when the trip means is depressed by the stop element, with which engaged. The indexed holder portion is automatically re-locked in its new position. Upon return movement of the handle, the above sequence of operations is reversed except that the stop pin used for locking the holder portion is already in locking position, as indicated.

The above generally-described tool comprises a base 15 having a center post 16 and adapted to be mounted on a lathe, milling machine or drilling machine, as hereinabove indicated, an operating shaft 17 extending diametrally across said base and provided with an actuator handle 18 on an end that extends from the base, and with a segmental bevel gear 19 on the opposite end of said shaft, a cam ring assembly 20 mounted to rotate around the axis of the base 15 and provided with segmental gear teeth 21 engaged with the segmental gear 19, a retainer 22 affixed to the base and engaged with the cam ring assembly to retain the same in operative rotational position, a stop and trip pin housing 23 affixed to said base 15 in diametrally opposed relation to the retainer 22, operatively engaged stop pin means 24 and trip pin means 25, housed partly in the base 15 and partly in the housing 23, the trip pin means also having operating portions engaged with the shaft 17, a center plate 26 mounted on the base 15 and rotational on needle bearings 27 around the post 16 of said base, a pair of oppositely arranged compression springs 28 fitted into said plate 26, a station-advancing ratchet plate 29 operatively engaged with said springs to compress the same, a set of stop elements 30 extending radially in the plate 26 to operatively engage the trip pin means 25, a tool- or work-mounting top plate 31 affixed to the top of the center plate 26, means 32 controlled by the shaft 17, for raising the top plate 31, a pair of locators 33 pivotally carried by the base 15 and movable by the cam ring assembly 20 to accurately orient the center plate 26 with the base 15 at each indexed position to thereby accurately orient a tool or work-piece on the top plate 31 with said base 15, and a pair of clamps 34 to clamp and lock the base 15 on the plate 26.

Figure 8:
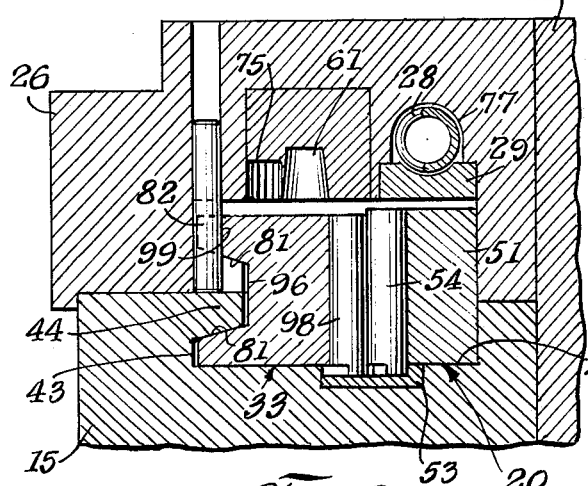
FIG. 8 is a fragmentary vertical sectional view as taken on the line 8—8 of FIG. 4.
Figure 9:
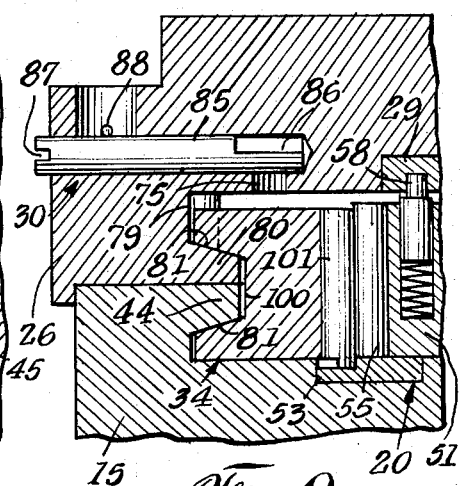
FIG. 9 is a similar sectional view as taken on the line 9—9 of FIG. 4.

The base 15 is provided with a diametral bore 40 which extends through the post 16, the opposite ends of said bore being formed as counterbores 41 and 42. As best seen in FIGS. 1, 8 and 9, an annular undercut groove 43 defines an inner flange 44, the lower surface of which has a shallow conical form. Inward of the groove 43, the base is formed with an annular seat 45. A hub 46 encircles the post 16 and defines the inner perimeter of the annular seat 45. The post 16 extends above said hub 46 which is level at the top with the top of the flange 44.

The operating shaft 17 is enclosed at one end by an end cap 47 outward of the segmental gear 19, and has an extension 48 to which the handle 18 is secured. Inward of the extension 48, the shaft is provided with a sleeve 49 that is provided with a slot 50 with which the stop pin means 24 is engaged.

The cam ring assembly 20 comprises a ring member 51 having a lip 52 that is engaged with the retainer 22 and is held thereby against upward displacement while being free to rotate around the hub 46, as driven by the gear 19 and the teeth 21, when the handle 18 is actuated. Two cam segments 53 are each carried by hardened wear pins 54 and 55 at approximately opposite sides of the ring member 51. Each said segment 53 is provided with cam grooves 56 and 57 for operatively moving the locators 33 and the clamps 34. At diametrally opposite points, the ring member 51 mounts a pair of retractable pins 58 that have upwardly extending ends. FIG. 11 shows the segmental gear teeth 21 by means of which the segmental gear 19 shifts the cam ring assembly between the retracted position of FIG. 5 and the projected position of FIG. 4, under control of the handle 18.

Figure 7:
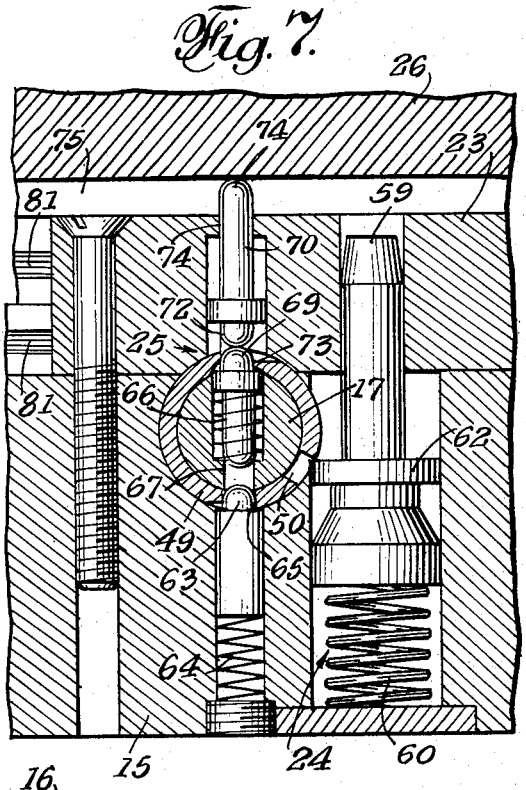
FIG. 7 is a similar sectional view showing said means in the released position of FIG. 5.

The stop pin means 24 is best seen in FIGS. 6 and 7, the same comprising a locating pin 59 that is biased upwardly by a spring 60 and is engageable in one of the seats 61 formed in the middle plate 26, as will be later described. Said stop pin is provided with an annular flange 62 intermediate its ends, the same extending into the slot 50 of the sleeve 45 which is rotated in one direction by the pin 59 when the same is projected by the spring 60 and in the opposite direction by the shaft 17 to cause retraction of said pin 59.

The trip pin means 25 is shown as a sleeve-locking plunger 63 in the base 15 and normally biased by a spring 64 to enter a hole 65 in the sleeve 49 when said hole is moved into register therewith, a spring-biased pin 66 disposed transversely in a through hole 67 in the shaft 17 and having an end 69 that is enterable in a hole 73 in sleeve 49. A pin 70, freely movable in a bore 71 in the trip pin housing 23, has an end 72 enterable into a hole 73 in the sleeve 49 when said hole is aligned with the latter pin and an opposite end 74 and extending into an annular groove 75 in the under face 76 of the center plate 26.

Said center plate 26 is provided, in said face 76, with a pair of oppositely arranged arcuate grooves 77 (FIGS. 1, 2 and 8) in which the mentioned compression springs 28 are disposed. One end of each said spring is engaged with an abutment pin 78 in the plate 26.

Said center plate 26, in a manner similar to the base 15, is provided with an undercut annular groove 79 that defines an inner flange 80. As shown best in FIG. 9, the flanges 44 and 80 of the base 15 and plate 26, together, form an inwardly projecting flange that has oppositely sloped or conical faces 81. A set of equally spaced locator pins 82, eight such pins being shown, is provided, one for each index position of the device.

The station-advancing ratchet plate is provided with spring-compressing pins 83 (FIG. 3) which engage the free ends of the springs 28 to compress the same upon rotation of the plate 26 in one direction, said pins 82 constituting abutments relative to which the plate 26 rotates in the opposite direction under propulsion by said springs.

The station-advancing ratchet plate 29, on its under face, is provided with a set of eight ratchet grooves 84 that cooperate with the ratchet pins 58 to prevent retractive rotational movement of the center plate 26.

There are eight stop elements 30, each of which comprises a pin 85 with a half-round end 86 that extends across the top of the annular groove 75 into which the trip pin end 74 extends. Depending on whether the rounded or the flat side of said pin end 86 is down, will determine whether the trip pin means 25 will be tripped when the plate 26 is being propelled by the compressed springs 28. A slot 87 in the end of each stop pin 85 enables a screw driver blade to make the necessary adjustment, and a limit pin 88 on pin 85 limits the end adjusted positions.

The work- or tool-mounting plate 31 is generally conventional for such plates, being provided with suitable radial or otherwise directed slots 89 for securing T-bolts. The plate 31 may be fastened in any suitable manner to the center plate 26 and, in effect, becomes part of the latter plate as an operative unit. A central recess 90 in the bottom of plate 31 accommodates a retainer disc 91 that is affixed to the top of post 16 and is diametrally larger than the post to retain the bearing needles 27 and also engage and retain the center plate 26, as can be seen in FIG. 1.

The means 32 is shown as a cam portion 92 formed in the shaft 17, a lift pin 93 having one end engaged with said cam portion, and adjustable screw means 94 in the center of the top plate 31 and engaged with the opposite end of said pin 93. It will be clear that the plates 26 and 31, as a unit, are raised by cam portion 92 when the handle 18 is pulled through an arc of ninety degress from the position of FIG. 4 to the position of FIG. 5, and that said plates will drop gravitationally onto the base upon return rotational movement of the handle.

There are two locators 33 (FIGS. 3, 4, 5 and 8), each mounted on a pivot 95 to swing by the cam grooves 56 of the cam ring assembly to and from engagement of the groove 96 thereof with the above-described inwardly projecting flange 44, 80 of the base 15 and center plate 26. When outwardly swung by said cam grooves 56, engagement of the wear pins 97 of the cam ring member 51 and the wear pins 54 of said locators bring notches 99 in the locators into engagement with two of the mentioned locator pins 82, thereby accurately locating the center plate 26 in indexed relation to the base 15.

There are two clamps 34 which are moved by cam grooves 57 of said cam ring means between clamping and release positions, as in FIGS. 4 and 5. In this case, the clamps 34 are moved bodily so that the grooves 100 therein engage the conical faces 81, above mentioned, in a manner to firmly clamp the center plate 26 to the base 15 when the wear pins 55 on the cam ring member 51 engage the wear pins 101 of the clamps, as is illustrated in FIG. 9. In this manner, the tool is firmly locked in indexed position.

*Operation*

After the stop elements 30 have been adjusted, as desired, to effect desired increment of index movement from one station to the next station, the handle 18 is pulled forwardly through an arc of approximately ninety degrees.

Since before such movement is begun, the locators 33 and clamps 34 are in the locating and clamping positions of FIG. 4, the first portion of movement of the handle will turn the cam ring 51 in the direction of arrow 103 to retract and release the clamps 34 and retract the locators from their engagement with the locator pins with which they had been engaged. As the handle movement is continued, the cam 92 thereon raises pin 93, causing the same to raise the rotational portion of the tool, i.e., the center plate 26 and the top plate 31 affixed thereto. Such raising movement need not be greater than is necessary to clear the base 15—about .010 inch.

Upon continued movement of handle 18, the end 69 of pin 66 will be projected, by the bias on said pin, into the hole 73 in the sleeve 49. Therefore, the pin end 69 will lock the sleeve to the shaft 17 so said sleeve will turn with the shaft. Because of the interengagement of said sleeve with the flange 62 of the locating pin 59, such rotation of sleeve 49 will cause retraction of said locating pin against the bias of spring 60 and withdrawal of said pin from the seat 61 in which it has been engaged. The detent plunger 63 locks the sleeve 49, as the pin 59 reaches retracted position. See FIGS. 6 and 7 which show the above-described interlock of the shaft and sleeve and retraction of the locator pin 59.

During the above movement of the handle 18, the ratchet pins 58 on the cam ring member 51 turn the ratchet ring 29, thereby causing the springs 28 to be compressed while the stop pin 59 is still engaged in said seat 61. As the pin 59 is withdrawn, the springs 28 expand and propel the rotatable part of the tool so that the next rounded part 86 of a stop element 30 will depress the release pin 70 so that its end 72, by engaging the end 69, retracts the pin 66 from hole 73. Depression of pin 66 causes the same to engage and retract the plunger 63. Thus, the sleeve 49 is released and spring 60 now becomes effective to instantly project the stop pin 59 so it will enter the next seat 61. Although the shaft 17 is still in the rotated position of FIG. 7, the sleeve 49 is now in the return position of FIG. 6, having been moved to this position by projection of the stop pin.

It is not until the pin 70 is depressed that the stop pin 59 is allowed to move into stopping engagement in a seat 61. Hence, when the flat of a stop element 30 moves past the pin 70, the sleeve 49 remains locked to the shaft 17 by the pin end 69 and the pin 59 remains retracted. As a consequence, the raised and freely rotational part of the device will turn under propulsion of the springs 28 until the pin 70 is engaged and depressed to cause release of the stop pin 59 so the same may enter a seat 61. As many as three or four indexing increments may be had instead of a single or double increment, according to the rotational adjustment of the elements 30.

Upon return of the handle 18 to its initial position, except that the pin 59 is already in its seat, the above-described sequence of operations is repeated in reverse to cause lowering of the top plate, accurate location thereof relative to the base, and firm clamping of the center plate to the base. Since the ratchet pins 58 prevent retractive movement of the ring 29, the device is now ready for the next operative movement of the handle 18 and ensuing indexing movement of the work- or tool-holding top plate according to the adjustment of the elements 30.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. An indexing tool holder comprising:
   (a) a fixed base part,
   (b) a holder part rotationally mounted on the base part,
   (c) spring means for rotating the holder part relative to the base part,
   (d) a plurality of stop elements on one part,
   (e) trip pin means on the other part engaged with the stop elements successively,
   (f) lock pin means connecting the parts and controlled by the trip means, and
   (g) means including a handle-controlled shaft to compress the spring means and operate the trip means to propel the holder part rotationally on the base part.

2. An indexing tool holder according to claim 1 provided with
   (a) a cam ring assembly rotated by the mentioned shaft,
   (b) means controlled by the cam ring assembly to locate the holder part relative to the base part after propulsion of the latter, and
   (c) clamp means controlled by the cam ring assembly to clamp the parts together.

3. An indexing tool holder comprising:
   (a) a fixed base part,
   (b) a holder part rotationally mounted on the base part,
   (c) a plurality of adjustable stop elements carried by the holder part,
   (d) an operating handle-provided shaft carried by the base part,
   (e) means to locate the two parts in indexed position,
   (f) means to clamp said parts together, when indexed,
   (g) cam means controlled by said shaft to project and retract the locator and clamp means,
   (h) means to lift the holder part frictionally clear of the base part,
   (i) means on the shaft to operate said lifting means,
   (j) spring means carried by one part,
   (k) ratchet means carried by the other part and operated by the cam means to compress the spring means,
   (l) means to releasably connect the parts, and
   (m) trip means on the base part engaged by the stop elements to retract the releasable connecting means to allow propulsion of the holder part by the spring means and to trip the connecting means after such propulsion of the holder part.

4. A tool holder according to claim 3 in which the adjustable stop elements are arranged radially around the center of rotation of the holder part, each said element having a portion with a trip portion and a by-pass portion.

5. A tool holder according to claim 3 in which the means to locate the two parts comprise a pair of locators pivotally mounted on one part and provided with a portion having locating engagement with a pin in the other portion.

6. A tool holder according to claim 3 in which the means to clamp the parts comprises a pair of clamp members having grooves, and the adjacent portions of the base and holder parts are provided with adjacent annular flanges that fit into the grooves of the clamp members and are clamped by the clamp members.

7. A tool holder according to claim 3 in which the holder-part lifting means comprises a cam part on the shaft, and a pin projected by the cam part and engaged at its upper end by the holder part.

8. A tool holder according to claim 3 in which the trip means comprises:
   (a) a sleeve on the shaft and engaged with the means to releasably connect the two parts,
   (b) a locking pin carried by the shaft and biased to connect the sleeve to turn with the shaft during initial movement of the shaft handle,
   (c) a release pin engaged by the stop elements to move said locking pin to sleeve-releasing position, and
   (d) a spring bias on the parts-connecting means to project the latter to connect the base and holder parts upon such movement of the means to releasably connect.

9. An indexing tool holder comprising:
   (a) a base part,
   (b) a holder part mounted rotationally on the base part,
   (c) means to releasably clamp the two parts together,
   (d) means on the base part to rotationally locate and release the holder part,
   (e) means to raise the holder part from the base part to free the former for free rotation relative to the latter,
   (f) spring means interconnecting said parts,
   (g) means including a shaft providing with an operating handle to successively release the clamp means, move the locator means to release the holder part, raise the holder part from the base part, and simultaneously compress the spring means when said handle is moved in one direction,
   (h) a stop pin releasably connecting the two parts,
   (i) trip means controlled by said shaft to retract said stop pin from parts-connecting position near the the end of said movement of the handle, and
   (j) pre-settable means to trip the trip means to release the same to move to parts-connecting position,
   (k) the mentioned clamp means engaging, and the locator means moving to locator position, and the raising means releasing the holder part to lower the same.

10. An indexing tool holder comprising:
    (a) a fixed base part,
    (b) a holder part rotationally mounted on the base part,
    (c) an operating shaft provided with a handle for rotating the shaft back and forth through approximately ninety degrees, (d) means controlled by the handle, when moved in one direction, to sequentially release the holder part from clamped and located position connection with the base part and raise the holder part to be frictionally clear of the base part, (e) means controlled by the handle during such movement to impose a spring bias on the holder part, (f) a spring-biased stop pin releasably connecting the two parts during said handle movement, (g) trip pin means normally disconnected from the stop pin and set up by the shaft during said movement of the handle to retract the stop pin at the end of said handle movement to allow said spring bias to propel the holder part relative to the base part, and (h) adjustable means on the holder part to engage the set-up trip means during propulsion of the holder part to trip the same so the spring bias on the stop pin will project the same to parts-connecting position.

11. An indexing tool holder according to claim 10 in which is provided a cam ring assembly, controlled by the shaft, to move the locator and clamping means between a parts locating and clamping position and a release position.

No references cited.

FRED C. MATTERN, JR., *Primary Examiner.*